United States Patent
Eager

(10) Patent No.: US 12,018,609 B2
(45) Date of Patent: Jun. 25, 2024

(54) ELECTRIC ASSIST TURBOCHARGER

(71) Applicant: Perkins Engines Company Limited, Peterborough (GB)

(72) Inventor: Antony James Eager, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 17/802,253

(22) PCT Filed: Feb. 11, 2021

(86) PCT No.: PCT/EP2021/025052
§ 371 (c)(1),
(2) Date: Aug. 25, 2022

(87) PCT Pub. No.: WO2021/170293
PCT Pub. Date: Sep. 2, 2021

(65) Prior Publication Data
US 2023/0082234 A1 Mar. 16, 2023

(30) Foreign Application Priority Data
Feb. 25, 2020 (GB) ..................... 2002604

(51) Int. Cl.
*F02B 37/14* (2006.01)
*F02B 33/40* (2006.01)
(Continued)

(52) U.S. Cl.
CPC .............. *F02B 37/14* (2013.01); *F02B 33/40* (2013.01); *F02B 37/10* (2013.01); *F02B 39/10* (2013.01);
(Continued)

(58) Field of Classification Search
CPC .......... F02B 37/04; F02B 37/10; F02B 37/12; F02B 37/14; F02B 39/10; F02B 33/40;
(Continued)

(56) References Cited

U.S. PATENT DOCUMENTS 6,637,205 B1 10/2003 Ahmad et al.
6,647,724 B1 11/2003 Arnold et al.
(Continued)

FOREIGN PATENT DOCUMENTS

EP 2302184 A1 3/2011
EP 3002442 A1 4/2016
(Continued)

OTHER PUBLICATIONS

International Search Report related to Application No. PCT/EP2021/025052; reported on Mar. 19, 2021.
(Continued)

*Primary Examiner* — Loren C Edwards

(57) ABSTRACT

An electric assist turbocharger unit for use in an internal combustion engine, comprising a shaft configured for torque-transmittingly connecting a compressor to a turbine of the turbocharger unit and an electric motor configured for rotatably actuating the shaft in a first rotational direction and in an opposed second rotational direction. The engine includes an aftertreatment system, and the rotation of the shaft is designed to retard the flow of intake air through an intake passage and of exhaust gases through the aftertreatment system, thereby controlling the temperature in the aftertreatment system.

9 Claims, 3 Drawing Sheets

(51) Int. Cl.
  *F02B 37/10* (2006.01)
  *F02B 39/10* (2006.01)
  *F02D 41/02* (2006.01)
  *F02D 41/14* (2006.01)

(52) U.S. Cl.
  CPC ....... *F02D 41/021* (2013.01); *F02D 41/1401* (2013.01)

(58) Field of Classification Search
  CPC ............... F02D 41/0007; F02D 41/021; F02D 41/1401; F01N 3/10
  See application file for complete search history.

(56) References Cited

U.S. PATENT DOCUMENTS

| | | | |
|---|---|---|---|
| 6,705,084 B2 | 3/2004 | Allen et al. | |
| 7,237,381 B2 | 7/2007 | Kolavennu et al. | |
| 10,100,764 B2 | 10/2018 | Pappenheimer et al. | |
| 10,156,211 B1 | 12/2018 | Martin et al. | |
| 2014/0033706 A1 | 2/2014 | Favaretto | |
| 2014/0060006 A1 | 3/2014 | Ruona et al. | |
| 2018/0142612 A1* | 5/2018 | Immendoerfer | F01D 15/10 |
| 2019/0242296 A1* | 8/2019 | Zhang | F02B 37/10 |

FOREIGN PATENT DOCUMENTS

| | | |
|---|---|---|
| EP | 3434886 A1 | 1/2019 |
| JP | 2007278066 A | 10/2007 |
| JP | 2016011632 A | 1/2016 |

OTHER PUBLICATIONS

Great Britain Search Report related to Application No. 2002604.3; reported on Jul. 13, 2020.

* cited by examiner

ELECTRIC ASSIST TURBOCHARGER

CROSS-REFERENCE TO RELATED APPLICATION

This Application is a 35 USC § 371 US National Stage filing of International Application No. PCT/EP2021/025052 filed on Feb. 11, 2021 which claims priority under the Paris Convention to Great Britain Patent Application No. 2002604.3 filed on Feb. 25, 2020.

BACKGROUND

Embodiments of the present invention provide a turbocharger unit for use in an internal combustion engine, an internal combustion engine equipped with such a turbocharger unit and a method for operating a turbocharger unit.

To reduce pollutant emissions from internal combustion engines, e.g. emissions of particulate matter and nitrogen oxides, an aftertreatment system can be used to purify engine exhaust gases before the gases are expelled into the environment. However, engines equipped with aftertreatment systems need effective thermal management systems capable of adjusting the temperature of exhaust gases to ensure proper and effective operation of the aftertreatment systems. For example, when using a catalytic aftertreatment device, such as an oxidation catalyst, a minimum exhaust gas temperature is required to initiate the catalytic reaction, also referred to as catalyst light-off. To that end, when using a particulate filter for aftertreatment, a filter regeneration process is performed periodically or continuously, during which accumulated particulates are burned off. For doing so, a catalyst may be used which likewise requires a minimum exhaust gas temperature for reaching its light-off temperature.

Intake throttle valves, exhaust back pressure regulators and/or burner systems may be used to elevate the exhaust gas temperature in the aftertreatment device above a minimum temperature required for effective processing of the engine's emissions. In such approaches, additional components—valves, regulators etc.—are incorporated into the internal combustion engine to lower or raise gas flow so as to modulate exhaust gas temperatures in the aftertreatment device.

To that end, methods are known, for example from U.S. Pat. No. 10,100,764 B2 that use a turbocharger arrangement provided in the internal combustion engine to adjust the exhaust gas temperature.

In general, turbochargers are typically used for improving performance and efficiency of internal combustion engines. This is achieved by using a part of the exhaust gas' energy for charging intake air. In this way, more air and proportionally more fuel can be fed into a combustion chamber of the engine to provide greater charge density during combustion, thereby increasing power output and engine-operating efficiency. From recent developments, the use of electrically assisted turbochargers may be used to improve a transient response of an engine, where the turbocharger is operated or assisted by an electric motor.

U.S. Pat. No. 10,100,764 B2 discloses a method in which an electrically assisted turbocharger can be operated in a generator mode in which kinetic energy of a turbine wheel is partially converted into electrical energy.

SUMMARY

Embodiments of the present disclosure provide an electric assist turbocharger unit, an engine equipped with such a turbocharger unit and a method for operating an electric assist turbocharger unit, where the electric assist turbocharger unit enables thermal management of exhaust gases, including rapid increase in exhaust gas temperature and, at the same time, contribute to an efficient/effective design of the turbocharger unit.

In embodiments of the present disclosure, a turbocharger unit for use in an internal combustion engine is provided. The turbocharger unit comprises a shaft configured for connecting a compressor to a turbine of the turbocharger unit in a torque transmitting manner. Further, the turbocharger unit comprises an electric motor configured for rotatably actuating the shaft in a first rotational direction and in an opposed second rotational direction.

Furthermore, an internal combustion engine is provided which is equipped with such a turbocharger unit.

Since the internal combustion engine is equipped with the above described turbocharger unit, technical features which are described in connection with the turbocharger unit in the present disclosure may also relate and be applied to the proposed internal combustion engine, and vice versa.

To that end, a method for operating a turbocharger unit of an internal combustion engine is provided, wherein the turbocharger unit comprises a shaft which provides for torque transmission between a compressor and a turbine of the turbocharger unit and an electric motor configured for rotatably actuating the shaft in a first rotational direction and in an opposed second rotational direction. The method comprises the step of increasing the temperature of exhaust gas of the engine by rotatably actuating the shaft in the second rotational direction.

The proposed method may particularly be provided for operating the turbocharger unit as described above. Accordingly, technical features which are described in connection with the proposed turbocharger unit or the proposed internal combustion engine in the present disclosure may also relate and be applied to the method, and vice versa.

BRIEF DESCRIPTION OF THE DRAWINGS

The present disclosure will be more readily appreciated by reference to the following detailed description when being considered in connection with the accompanying drawings in which.

DESCRIPTION

Figure 1:
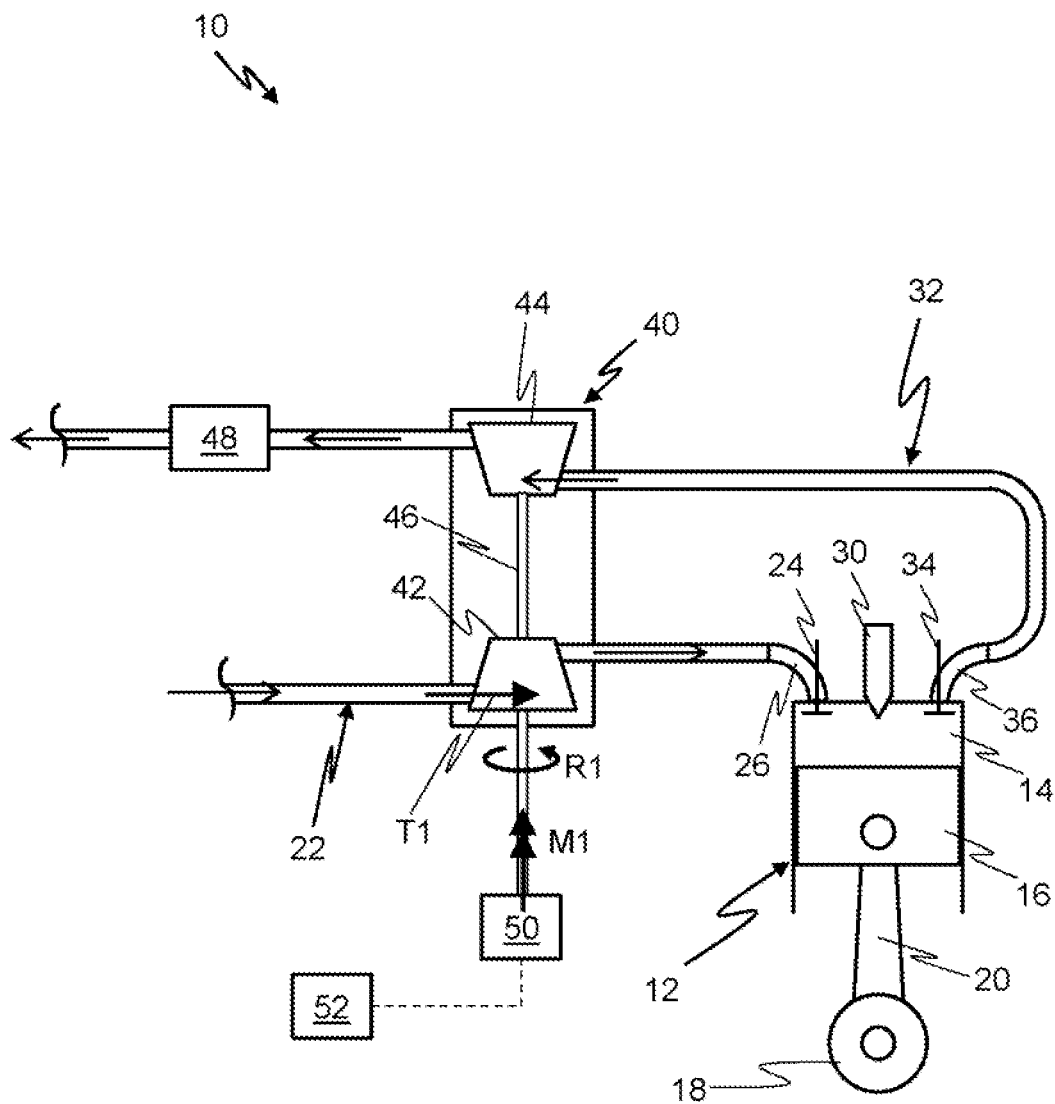
FIG. 1 schematically shows an internal combustion engine equipped with a turbocharger unit, in accordance with some embodiments of the present disclosure, which is operated in a transient operating mode.

In the following, the invention will be explained in more detail with reference to the accompanying Figures. In the Figures, like elements are denoted by identical reference numerals and repeated description thereof may be omitted in order to avoid redundancies.

FIG. 1 schematically shows an internal combustion engine 10, also referred to as the "engine" in the following, provided in the form of a reciprocating engine, such as a diesel engine, a dual fuel engine, etc., which is installed on a vehicle (not shown). The engine 10 comprises at least one cylinder 12, preferably more than one cylinder 12, i.e. 4, 6, 8 or more cylinders. Each cylinder 12 is provided with a combustion chamber 14 delimited by the cylinder 12 and the piston 16 accommodated therein. The piston 16 is configured for reciprocatingly moving within the cylinder 12 and is connected to a crankshaft 18 of the engine 10 via a connecting rod 20.

During operation of the engine 10, each one of the combustion chambers 14 is supplied with a fuel air mixture which is to be ignited therein so as to produce high-temperature and high-pressure gases which apply forces to and thus axially move the associated pistons 16, thereby rotating the crankshaft 18. In this way, chemical energy is transformed into mechanical energy. The fuel air mixture to be supplied to and ignited in the combustion chamber 14 is formed by mixing a fuel medium, i.e. diesel fuel, with intake air, i.e. fresh or ambient air from outside the vehicle.

Specifically, for supplying intake air into the combustion chamber 14, the engine 10 comprises an intake passage 22 connected to the combustion chamber 14, wherein the supply of intake air into the combustion chamber 14 is variedly adjusted by means of an intake air valve 24. The intake passage 22 is configured for collecting and guiding fresh intake air from outside the vehicle to each one of the combustion chambers 14. In the shown configuration, intake air is guided into the different combustion chambers 14 by means of an intake manifold 26 configured to split an intake air stream flowing through a common flow passage of the intake passage 22 into separate intake air streams, each of which is guided to an associated one of the combustion chambers 14 via separate flow passages of the intake manifold 26.

To that end, for supplying the fuel medium into the combustion chamber 14 of each cylinder 12, a fuel injection valve or pump 30 is provided for variedly injecting the fuel medium into the combustion chamber 14.

The combustion chamber 14 of each cylinder 12 is further connected to an exhaust passage 32 for expelling combustion gases, also referred to as "exhaust gases" in the following, from the combustion chamber 14, i.e. after combustion of the fuel mixture took place. For controlling the expelling of combustion gases, an exhaust valve 34 is provided which variedly expels exhaust gases from the combustion chamber 14 into the exhaust passage 32. Exhaust gases are separately expelled from the combustion chambers 14 and are merged to a common exhaust gas stream flowing through the exhaust passage 32 by means of an outtake manifold 36 arranged downstream of the combustion chamber 14. In the context of the present disclosure, the terms "downstream" and "upstream" refer to a flow direction of gases within the engine 10, e.g. a flow direction of intake air flowing through the intake passage 22 and a flow direction of exhaust gases flowing through the exhaust passage 32.

The engine 10 is further equipped with a turbocharger unit 40 which is configured to use engine's exhaust energy comprised in the exhaust gas flowing through the exhaust passage 32 to compress and thus to charge intake air flowing through the intake passage 22. For doing so, the turbocharger unit 40 comprises a compressor 42 arranged within the intake passage 22 such that intake air flowing through the intake passage 22 is guided therethrough. The compressor 44 is mechanically coupled to a turbine 44 in a torque-transmitting manner via a drive shaft 46. In other words, the drive shaft 46 is configured for torque-transmittingly connecting the compressor 42 to the turbine 44.

The turbine 44 is arranged within the exhaust passage 32 such that exhaust gas flowing through the exhaust passage 32 is guided through the turbine 44. In this way, exhaust gas flowing through the exhaust passage 32 rotatably actuates the turbine 44 which, by means of the shaft 46, drives the compressor 44 so as to charge intake air which is guided therethrough.

As can be gathered from FIG. 1, an aftertreatment device 48 is arranged in the exhaust passage 32 downstream of the turbine 44. The aftertreatment device 48 is configured for purifying exhaust gas before being expelled into the environment. Specifically, the aftertreatment device 48 is configured to receive exhaust gas guided through an expanded in the turbine 44 that is to be exhausted to the atmosphere. Specifically, the aftertreatment device 48 serves for reducing emissions from the engine, such as particulate matter, nitrogen oxides, etc., which have been generated upon combusting the fuel air mixture. For doing so, the aftertreatment device 48 may be equipped with a catalyst.

In the context of the present disclosure, the aftertreatment device 48 refers to a component of the internal combustion engine 10 through which the exhaust gas is guided so as to remove emissions therefrom. For properly purifying the exhaust gas guided therethrough, the aftertreatment device 48 requires a minimum temperature of the exhaust gas to be fed thereinto.

More specifically, the aftertreatment device 48 may be provided in the form of or comprise a particulate filter, particularly a diesel particulate filter, designed for removing particulate matter, such as soot or smoke, from the exhaust gas. The particulate filter may be designed to burn off particulate matter removed from the exhaust gas and accumulated therein. The process of burning off accumulated particulates is also referred to as filter regeneration. For doing so, the particulate filter may be equipped with a catalyst which supports the filter regeneration process, i.e. combustion of the accumulated particulates. By such a configuration, however, a minimum temperature of exhaust gas guided into the aftertreatment device 48 is required so as to enable that the catalyst comprised in the particulate filter initiates the catalytic reaction, i.e. combustion of the accumulated particles.

Alternatively, the aftertreatment device 48 may be provided in the form of or, additionally, may comprise a lean NOx trap employed for reducing nitrogen oxide emissions from the exhaust gas. Likewise, the lean NOx trap requires that the exhaust gas guided thereinto has a minimum exhaust gas temperature so as to work properly.

Alternatively, the aftertreatment device 48 may be provided in the form of or, additionally, may comprise a selective catalytic reduction unit which uses a catalyst, e.g. vanadium-titanium or zeolite, to promote a reaction between nitrogen oxides present in the exhaust gas and a reagent, e.g. ammonia or urea, injected into the exhaust gas stream, particularly before being guided into the aftertreatment device 48, thereby reducing the nitrogen oxide level of the exhaust gas.

The basic structure and function of such an internal combustion engine 10 are well known to a person skilled in the art and are thus not further specified. Rather, characteristics of the turbocharger unit 40 of the engine 10 interlinked with the present invention are addressed in the following. The skilled person will understand that, although not further specified in the present disclosure, the internal combustion engine 10 may be equipped with further components, such as an exhaust gas recirculation system, an air intake filter etc.

As can be gathered from FIG. 1, the turbocharger unit 40 is further equipped with an electric motor 50 which is connected to the drive shaft 46 in a torque-transmitting manner. Specifically, the electric motor 50 is connected to a compressor end side of the drive shaft 46 so as to mechanically couple the electric motor 50 to the compressor 42. Alternatively, the electric motor 50 may be provided at the drive shaft 46 between the compressor 42 and the turbine 44 or at a turbine side end of the drive shaft.

The electric motor 50 is configured for rotatably actuating the drive shaft 46 in a first rotational direction R1 and in an opposed second rotational direction R2, i.e. which is opposed or reversed to the first rational direction R1. In other words, the electric motor 50 is configured to, in a first operating state of the turbocharger unit 40 depicted in FIGS. 1 and 2, actuate the drive shaft 46 together with the compressor 42 in the first rotational direction R1 and, in a second state of the turbocharger unit 40 depicted in FIG. 3, to actuate the drive shaft 46 together with the compressor 44 in the second rotational direction R2.

The turbocharger unit 40 further comprises a control unit 52 which is configured to control operation of the electric motor 50. Specifically, the control unit 52 is designed to control load, speed and rotational direction of the electric motor 50. For doing so, the control unit 52 transmits control signals to the electric motor 50, as indicated by dashed lines in FIGS. 1 to 3.

FIG. 1 shows a state of the engine 10 in which the engine 10 and thus the turbocharger unit 40 are operated in a transient operating mode. In this mode, the electric motor 50 rotatably actuates the drive shaft 46 together with the compressor 42 and the turbine 44 in the first rotational direction R1. In this way, the electric motor 50 is configured to convert electrical power supplied to the electric motor 50 into mechanical power for rotationally actuating the drive shaft 46. In other words, in the transient operating mode, the electric motor 50 additionally drives, actuates or accelerates the drive shaft 46 so as to increase, particularly temporally increase, the charging level of intake air being guided through the compressor 42 of the turbocharger unit 40, i.e. to increase pressure prevailing in the intake air received in the intake manifold 26 of the engine 10. In this way, a mass flow of intake air is increased which flows through the compressor 42 in a first translational direction T1 towards the intake manifold 26 and the combustion chamber 14 of each cylinder 12. In other words, the compressor 42, when being rotated in the first rotational direction R1, is configured to feed intake air through the intake passage 22 of the engine 10 in the first translational direction T1.

In general, the engine 10 is operated in the transient operating mode so as to increase, particularly rapidly increase, engine load. This mode typically requires to increase charging of intake air. However, since the compressor 42 for charging intake air is driven by exhaust gas flowing through the exhaust passage 32, the response time of the compressor 42 is subjected to a delay, also referred to as "turbo lack" when accelerating the engine load. Thus, for reducing response time of the compressor 42, the electric motor 50 is used to assist, i.e. accelerate, rotary motion of the compressor 42 so as to reach a desired charging level of intake air, i.e. a desired intake air pressure. For doing so, the electric motor 50 is configured to apply an acceleration torque M1 to the drive shaft 46, as depicted in FIG. 1 by arrow M1.

The control unit 52 is configured to operate the turbocharger unit 40 in the transient mode in dependence on an intake air pressure parameter and an exhaust gas pressure parameter.

In the context of the present disclosure, the term "intake air pressure parameter" refers to a parameter which is indicative of a pressure prevailing in the intake passage 22, particularly in the intake manifold 26 or in an intake line arranged between the compressor 42 of the turbocharger unit 40 and the intake manifold 26. The engine 10 or the turbocharger unit 40 is provided with a pressure sensor (not shown) which is configured to determine the intake air pressure parameter. The thus determined pressure is then transmitted to the control unit 52 in the form of an intake air pressure signal that comprises the intake air pressure parameter. In this way, the control unit 52 is provided with the intake air pressure parameter.

Further, in the context of the present disclosure, the term "exhaust gas pressure parameter" refers to a parameter which is indicative of a pressure prevailing in the exhaust gas, particularly in the outtake manifold 36 or an exhaust line arranged between the outtake manifold 36 and the turbine 44 of the turbocharger unit 40. The engine 10 is provided with a further pressure sensor (not shown) which is configured to determine the exhaust gas pressure parameter. The thus determined pressure is then transmitted to the control unit 52 in the form of an exhaust gas pressure signal that comprises the exhaust gas pressure parameter. In this way, the control unit 52 is provided with the exhaust gas pressure parameter.

More specifically, the control unit 52 may be configured to operate the turbocharger unit 40, particularly the electric motor 50, in the transient operating mode when the engine 10 is operated in the transient operating mode and/or when the received intake air pressure parameter falls below an intake air pressure threshold value and/or when the received exhaust gas pressure parameter falls below and exhaust gas pressure threshold value. The intake air pressure threshold value may constitute a demanded intake air pressure required for ensuring proper operation of the engine during the transient operating mode. The exhaust gas pressure threshold value may constitute a demanded exhaust gas pressure required for ensuring proper operation of the engine during the transient operating mode.

Figure 2:
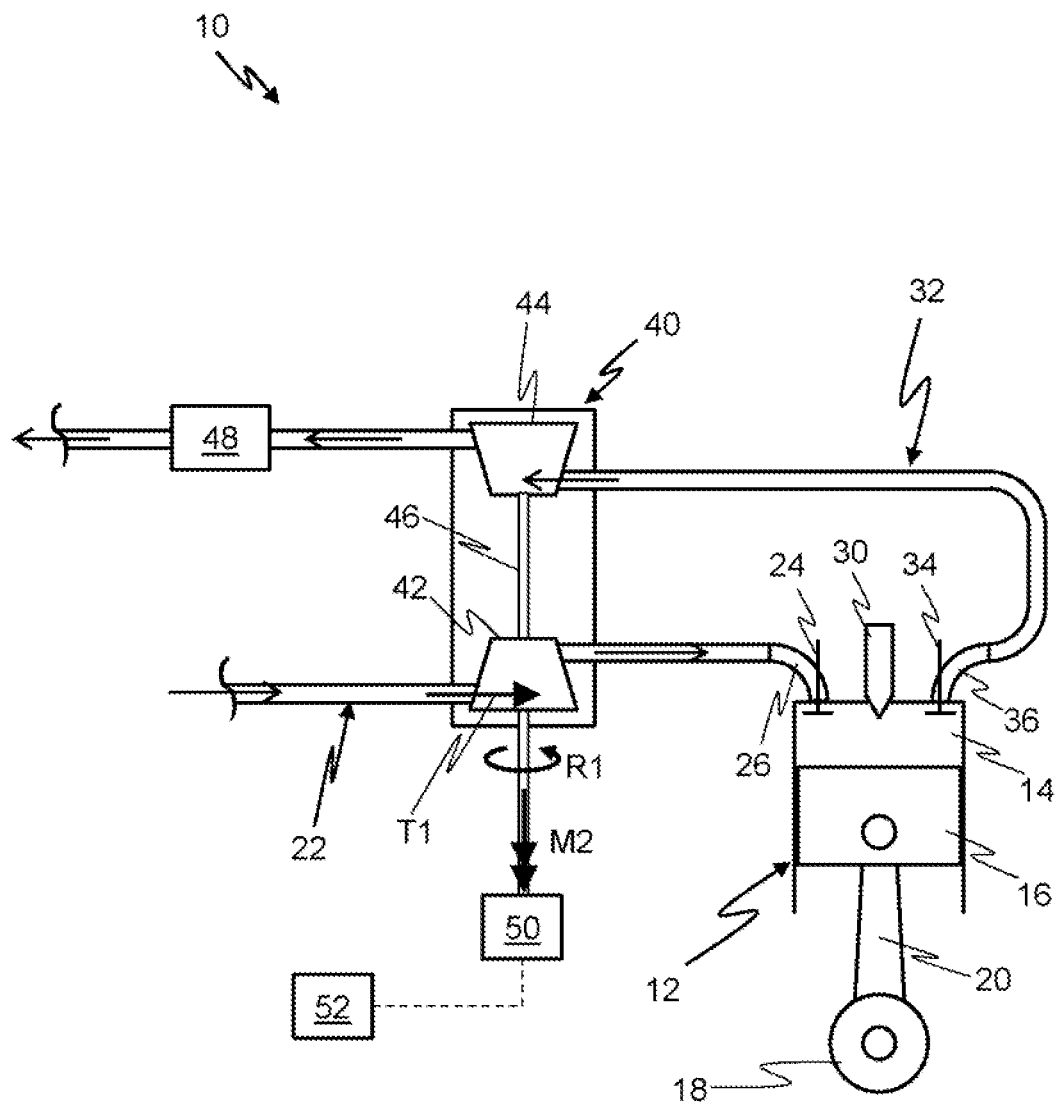
FIG. 2 schematically shows the internal combustion engine depicted in FIG. 1 in a state in which the turbocharger unit is operated in a deceleration mode.

Furthermore, the engine 10 and accordingly the turbocharger unit 40 are configured to be operated in a deceleration mode which serves and is intended to increase the temperature of exhaust gas to be guided into the aftertreatment device 48, particularly in order to reach a light-off temperature of the aftertreatment device 48 for ensuring proper removal of emissions from the exhaust gas. FIG. 2 shows a state of the engine 10 in which the turbocharger unit 40 is operated in the deceleration mode. In this operating mode, the control unit 52 is configured to decelerate rotary motion of the drive shaft 46, the compressor 42 and the turbine 44 which rotate in the first rotational direction R1. For doing so, as can be gathered from FIG. 2, the electric motor 50 is configured to apply a deceleration torque M2 to the drive shaft 46 so as to decelerate the drive shaft 48. This deceleration torque M2 acts in an opposed direction onto the drive shaft 46 compared to the acceleration torque M1.

As set forth above, in the deceleration mode, the compressor 42 is braked which reduces the air intake pressure and thus the air mass flow of intake air to be guided into the combustion chamber 14 of each cylinder 12. As a result, the air ratio, also referred to as lambda, of the fuel air mixture to be combusted in the combustion chamber 14 of each cylinder 12 is decreased which causes an increase of the combustion temperature in the combustion chamber 14. In this way, likewise the temperature of the exhaust gas increases.

Specifically, the control unit 52 is configured to operate the turbocharger unit 40, i.e. the electric motor 50, in the exhaust temperature increase mode in dependence on an exhaust gas temperature parameter.

In the context of the present disclosure, the term "exhaust gas temperature parameter" refers to a parameter which is indicative of a temperature of exhaust gas to be guided through the aftertreatment device 48. Specifically, the exhaust gas temperature parameter may be indicative of the temperature of the exhaust gas flowing through the exhaust passage 32 between the turbine 44 of the turbocharger unit 40 and the aftertreatment device 48. The engine 10 is provided with a temperature sensor (not shown) which is configured to determine the exhaust gas temperature parameter, particularly the temperature of exhaust gas flowing through an exhaust line arranged between the turbine 44 of the turbocharger unit 40 and the aftertreatment device 48. The thus determined temperature is then transmitted to the control unit 52 in the form of an exhaust gas temperature signal that comprises the exhaust gas temperature parameter. In this way, the control unit 52 is provided with the exhaust gas temperature parameter.

More specifically, the control unit 52 may be configured to operate the turbocharger unit 40, particularly the electric motor 50, in the deceleration mode when the received exhaust gas temperature parameter falls below an exhaust gas temperature threshold value. The exhaust gas temperature threshold value may constitute a desired or demanded value of the exhaust gas temperature which is required to enable the aftertreatment device 48 to properly work.

Figure 3:
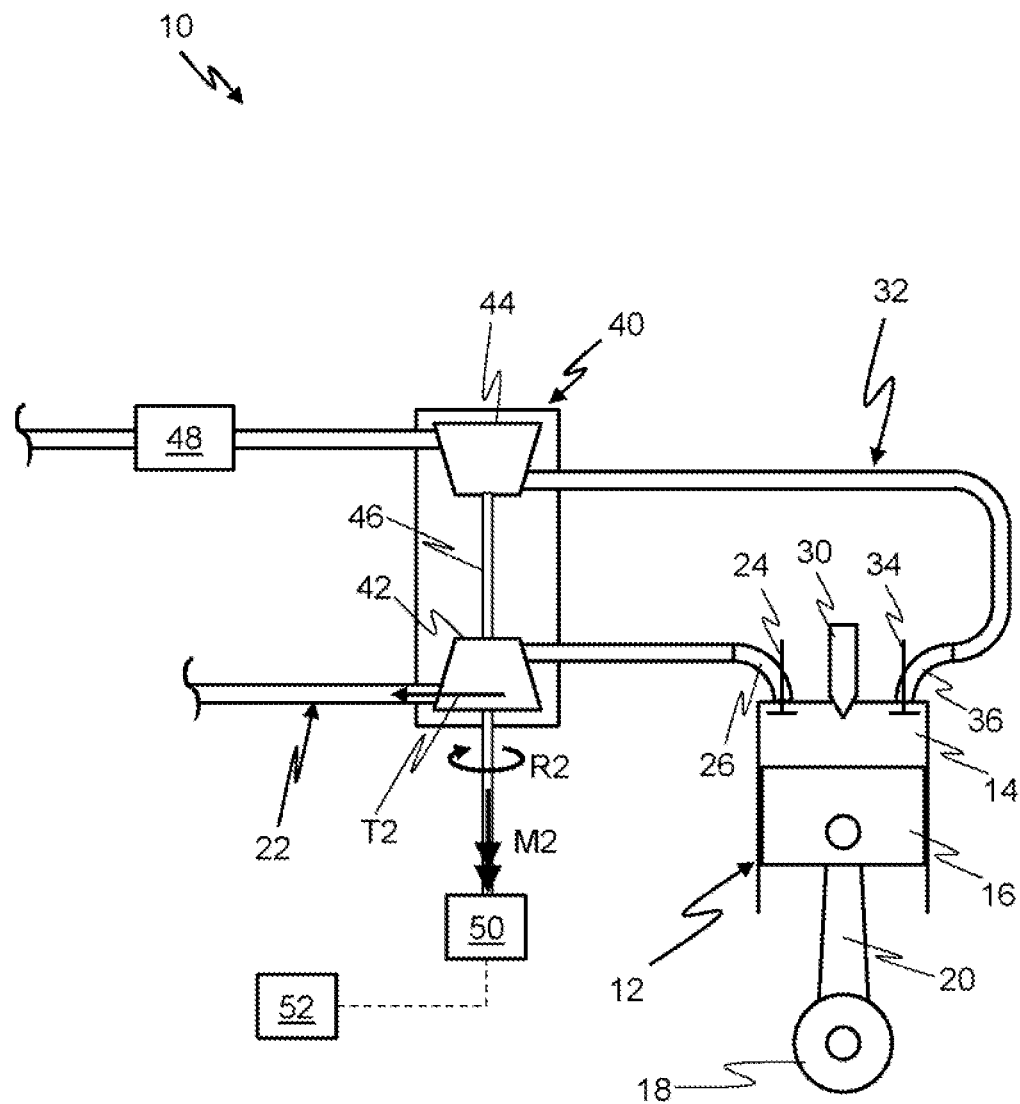
FIG. 3 schematically shows the internal combustion engine depicted in FIGS. 1 and 2 in a state in which the turbocharger unit is operated in a reverse mode.

Further, the proposed engine 10 and accordingly the proposed turbocharger unit 14 are configured to be operated in a reverse mode which serves and is intended for rapidly increasing the temperature of the exhaust gas, i.e. at a shorter response time compared to the deceleration mode. FIG. 3 shows a state of the engine 10 in which the turbocharger unit is operated in the reverse mode. In this mode, the electric motor 50 rotatably actuates the drive shaft 46 together with the compressor 42 in the second rotational direction R2, as can be gathered from FIG. 3 by the arrow R2. By doing so, the compressor 42, i.e. its compressor wheel, is driven in a reversed rotational direction compared to the transient operating mode or the deceleration mode or a normal operating mode of the engine 10 in which a load and speed of the engine 10 is maintained at a substantially constant level. Accordingly, in the reverse mode operating mode, the deceleration torque M2 applied to the drive shaft 46 has an absolute value which is greater compared to the deceleration mode.

Upon revising the rotational direction of the compressor 42, the turbocharger unit 40 causes intake air present in the intake line between the compressor 42 and the intake manifold 26 to be fed through the compressor 42 in an opposed second translational direction T2, i.e. opposed to the first translational direction. In this way, the intake air pressure, i.e. the pressure prevailing in the intake passage between the compressor 42 in the intake manifold 26, may be reduced in a particularly quick manner, i.e. at shorter reaction times compared to the deceleration mode. Accordingly, likewise the air ratio of the fuel air mixture to be combusted in the combustion chamber 14 of each cylinder 12 can be rapidly decreased, thereby enabling the combustion temperature and accordingly the exhaust gas temperature to rise at particularly short response times. To that end, the flow of exhaust gas guided through the exhaust passage 32 may be retarded. As a result, the pumping work of the engine is increased, thereby contributing to an increase of the exhaust gas temperature.

The control unit 52 is configured to operate the turbocharger unit 40, i.e. the electric motor 50, in the reverse mode in dependence on the exhaust gas temperature parameter. Specifically, the control unit 52 may be configured to operate the turbocharger unit 40, particularly the electric motor 50, in the reverse mode when the received exhaust gas temperature parameter is equal to or below the exhaust gas temperature threshold value.

More specifically, the control unit 52 is configured to operate the turbocharger unit 40 in the reverse mode in dependence on a difference between a desired temperature of the exhaust gas to be directed into the aftertreatment device 48 and the exhaust gas temperature parameter being indicative of an actual temperature of the exhaust gas to be directed into the aftertreatment device 48. Particularly, the control unit 52 is configured to operate the turbocharger unit 40 in the reverse mode when the difference between the desired temperature and the actual temperature of exhaust gas to be directed into the aftertreatment device 48 reaches or exceeds an exhaust gas temperature difference threshold value. When the difference between the desired temperature and the actual temperature of exhaust gas to be directed into the aftertreatment device 48 is below the exhaust gas temperature difference threshold value and above zero, the control unit 52 is configured to operate the turbocharger unit 40 in the deceleration mode.

In a further development, the turbocharger unit 40 may be configured to decrease a pressure drop the exhaust gas is subjected to upon flowing through the turbine 44 when the turbocharger unit 40 is operated in the reverse mode or the deceleration mode. For doing so, the turbocharger unit 40 may be configured to decrease or minimize the power produced by the turbine 44 upon being flooded with exhaust gas when being operated in the reverse mode or the deceleration mode. In this way, a pressure drop and accordingly a temperature drop the exhaust gas is subjected to upon flowing through the turbine may be decreased. This may contribute to increasing exhaust gas temperature to be directed into the aftertreatment device 48. For doing so, the turbocharger unit 40 may be equipped with a variable-geometry mechanism (not shown), through which the exhaust gas is guided, and which is configured for regulating power produced by the turbine 44. Specifically, the variable-geometry mechanism may be configured to adjust or manipulate a flow path of exhaust gas through the turbine 44 so as to control the amount of power extracted by the turbine 44.

Alternatively or additionally, the turbocharger unit 40 may be equipped with a decoupling mechanism (not shown), particularly in the form of a clutch, which is provided at the drive shaft 48 between the compressor 42 and the turbine 44. The decoupling mechanism may be configured for selectively engage or disengage the torque-transmitting connection between the compressor 42 and the turbine 44 of the turbocharger unit 40 provided by the drive shaft 46. Specifically, the decoupling mechanism may be configured to be operated by the control unit 52. For doing so, the control unit 52 may be configured to transmit control signals to the decoupling mechanism.

The decoupling mechanism may be configured to connect the compressor 42 to the turbine 44 via the drive shaft 46 when the turbocharger unit 40 is operated in the normal operating mode, the transient operating mode and/or the deceleration mode. Further, the decoupling mechanism may be configured to disengage the torque-transmitting connection provided by the drive shaft 46 between the compressor 42 and the turbine 44 when the turbocharger unit 40 is operated in the reverse mode. In other words, the control unit 52 may be configured to operate the decoupling mechanism in an engaged mode in which the torque-transmitting connection between the compressor 42 and the turbine 44 is established when the turbocharger unit 40 is operated in the normal operating mode, the transient operating mode and/or the deceleration mode. Further, the control unit 52 may be configured to operate the decoupling mechanism in a disengaged mode in which the torque-transmitting connection between the compressor 42 and the turbine 44 is decoupled when the turbocharger unit 40 is operated in the reverse mode.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A turbocharger unit for use in an internal combustion engine may be provided. The turbocharger unit may comprise a shaft configured for torque-transmittingly connecting a compressor to a turbine of the turbocharger unit and an electric motor configured for rotatably actuating the shaft in a first rotational direction and in an opposed second rotational direction.

Specifically, in a mounted state of the turbocharger unit in which the turbocharger unit is mounted to the internal combustion engine, the compressor, when being rotated in the first rotational direction, may be configured to feed intake air through an intake passage of the engine in a first translational direction towards a combustion chamber of the engine and, when being rotated in the second rotational direction, to feed intake air through the intake passage in an opposed translational direction.

In this way, by actuating the shaft of the turbocharger unit in the second rotational direction, the rotational direction of the compressor is reversed. As a result, the compressor may cause intake air present in an intake line between the compressor and a combustion chamber of the engine to be fed back through the compressor. Accordingly, the pressure prevailing in the intake line may be reduced in a particularly quick manner, i.e. at shorter reaction times. Likewise the air ratio of the fuel air mixture to be combusted in the combustion chamber of each cylinder can be rapidly decreased, thereby enabling the combustion temperature and accordingly the exhaust gas temperature to rise at particularly short response times in order to adjust a desired exhaust gas temperature.

The proposed turbocharger unit may be employed in any suitable turbocharged internal combustion engine, such as a reciprocating engine, in particular a diesel engine or a dual fuel engine. For example, such internal combustion engines may be utilized or be installed in vehicles, i.e. as main or auxiliary engines.

The turbocharger unit may be configured to be operated in a transient operating mode in which the electric motor is configured to rotatably actuate the shaft together with the compressor in the first rotational direction. Further, the turbocharger unit may be configured to be operated in a deceleration mode in which the electric motor is configured to decelerate a rotary motion of the shaft and the compressor which rotate in the first rotational direction. Still further, the turbocharger unit may be configured to be operated in a reverse mode in which the electric motor is configured to rotatably actuate the shaft together with the compressor in the second rotational direction.

The turbocharger unit may be further equipped with a control unit which is configured to operate the turbocharger unit in the reverse mode in dependence on an exhaust gas temperature parameter being indicative of an actual temperature of the exhaust gas to be directed into an aftertreatment device of the engine. Specifically, the control unit may be configured to operate the turbocharger unit in the reverse mode when the exhaust gas temperature parameter is equal to or below an exhaust gas temperature threshold value.

In a further development, the control unit may be configured to operate the turbocharger unit in the reverse mode in dependence on a difference between a desired temperature of the exhaust gas to be directed into the aftertreatment device of the engine and the exhaust gas temperature parameter. Specifically, the control unit may be configured to operate the turbocharger unit in the reverse mode when the difference between the desired temperature and the exhaust gas temperature parameter reaches or exceeds an exhaust gas temperature difference threshold value. To that end, the control unit may be configured to operate the turbocharger unit in the deceleration mode when the difference between the desired temperature and the exhaust gas temperature parameter is below the exhaust gas temperature difference threshold value.

Alternatively or additionally, the turbocharger unit may be configured to decrease a pressure drop the exhaust gas is subjected to upon flowing through the turbine when the turbocharger unit is operated in the reverse mode. Specifically, by doing so, the turbocharger unit may be configured to decrease the pressure drop compared to a state in which the turbocharger unit has been operated prior to being switched into the reverse mode. For doing so, the turbocharger unit may be configured to decrease the power produced by the turbine upon being flooded with exhaust gas when the turbocharger unit is operated in the reverse mode. Specifically, by doing so, the turbocharger unit may be configured to decrease the power produced by the turbine compared to a state in which the turbocharger unit has been operated prior to being switched into the reverse mode.

In a further development, the turbocharger unit may comprise a decoupling mechanism configured to selectively engage or disengage a torque-transmitting connection between the compressor and the turbine, wherein the decoupling mechanism is configured to disengage the torque-transmitting connection between the compressor and the turbine when the turbocharger unit is operated in the reverse mode.

Furthermore, an internal combustion engine may be provided which is equipped with a turbocharger unit as described above.

To that end, a method for operating a turbocharger unit for an internal combustion engine may be provided, wherein the turbocharger unit may comprise a shaft which torque-transmittingly connects a compressor to a turbine of the turbocharger unit and an electric motor configured for rotatably actuating the shaft in a first rotational direction and in an opposed second rotational direction. The method may comprise the step of increasing the temperature of exhaust gas of the engine by rotatably actuating the shaft in the second rotational direction, particularly by means of the electric motor.

INDUSTRIAL APPLICABILITY

With reference to the Figures and their accompanying description, a turbocharger unit for use in an internal combustion engine, an internal combustion engine which is equipped with a corresponding turbocharger unit and a method for operating a corresponding turbocharger unit are suggested. The turbocharger unit as mentioned above is applicable in internal combustion engines provided, for example, as diesel engines. The suggested turbocharger unit may replace conventional turbocharger units and may serve as a replacement or retrofit part. The turbocharger is an electric assist turbocharger and, in some embodiments, an electric motor that operates a shaft/turbine of the turbocharger to control a flow of exhaust gases so as to reduce the flow velocity of intake air guided through an intake passage into a combustion chamber of the engine and of exhaust gases through an aftertreatment system, thereby controlling the temperature of exhaust gases and thus of the aftertreatment system. In some embodiments, the shaft/turbine rotation is configured to be opposite to a rotation of the shaft/turbine that would be produced by the exhaust gases flowing from the engine, through the aftertreatment system and out through an exhaust.

The invention claimed is:

1. A turbocharger unit for use in an internal combustion engine, comprising:
a shaft configured for torque-transmittingly connecting a compressor to a turbine of the turbocharger unit;
an electric motor configured for rotatably actuating the shaft in a first rotational direction and in an opposed second rotational direction, the turbocharger unit being operable in a transient mode in which the electric motor is configured to rotate the shaft in the first rotational direction at a first torque, and in a deceleration mode in which the electric motor is configured to rotate the shaft in the first rotational direction but at a second torque, with the second torque being less than the first torque; and
a control unit which is configured to operate the turbocharger unit in a reverse mode in dependence on an exhaust gas temperature parameter being indicative of an actual temperature of an exhaust gas to be directed into an aftertreatment device of the engine;
wherein the turbocharger unit is configured to be operated in the reverse mode in which the electric motor is configured to rotatably actuate the shaft together with the compressor in the second rotational direction;
wherein the control unit is configured to operate the turbocharger unit in the reverse mode in dependence on a difference between a desired temperature of the exhaust gas to be directed into the aftertreatment device of the engine and the exhaust gas temperature parameter;
wherein the control unit is configured to operate the turbocharger unit in the reverse mode when the difference between the desired temperature and the exhaust gas temperature parameter reaches or exceeds an exhaust gas temperature difference threshold value;
wherein the control unit is configured to operate the turbocharger unit in the deceleration mode when the difference between the desired temperature and the exhaust gas temperature parameter is below the exhaust gas temperature difference threshold value.

2. The turbocharger unit according to claim 1, wherein in a mounted state of the turbocharger unit in which the turbocharger unit is mounted in the internal combustion engine, the compressor, when being rotated in the first rotational direction, is configured to feed intake air through an intake passage of the engine in a first translational direction towards a combustion chamber of the engine and, when being rotated in the second rotational direction, to feed intake air through the intake passage in an opposed translational direction.

3. The turbocharger unit according to claim 1, wherein the control unit is configured to operate the turbocharger unit in the reverse mode when the exhaust gas temperature parameter is equal to or below an exhaust gas temperature threshold value.

4. The turbocharger unit according to claim 1, which is configured to decrease a pressure drop in the exhaust gas flowing through the turbine when the turbocharger unit is operated in the reverse mode.

5. The turbocharger unit according to claim 1, which is configured to decrease a power produced by the turbine upon being flooded with exhaust gas when the turbocharger unit is operated in the reverse mode.

6. The turbocharger unit according to claim 1, which further comprises a decoupling mechanism configured to selectively engage or disengage a torque-transmitting connection between the compressor and the turbine, wherein the decoupling mechanism is configured to disengage the torque-transmitting connection between the compressor and the turbine when the turbocharger unit is operated in the reverse mode.

7. A method for operating a turbocharger unit of an internal combustion engine in a transient mode, a deceleration mode, and a reverse mode wherein the turbocharger unit comprises a shaft which torque-transmittingly connects a compressor to a turbine of the turbocharger unit and an electric motor configured for rotatably actuating the shaft in a first rotational direction and in an opposed second rotational direction at a first torque and a second torque, the method comprising:
operating the turbocharger unit in the transient mode by rotating the shaft in the first rotational direction at the first torque,
increasing a temperature of an exhaust gas of the engine at a first rate by operating the turbocharger unit in the deceleration mode wherein the shaft is rotated in the first rotational direction but at the second torque with the second torque being less than the first torque; and
increasing the temperature of the exhaust gas of the engine at a second rate greater than the first rate by operating the turbocharger unit in the reverse mode wherein the shaft is rotated in the second rotational direction.

8. The method of claim 7, further including step of providing a clutch on the shaft.

9. The method of claim 8, further including a step of connecting and disconnecting the compressor and turbine using the clutch.

* * * * *